Feb. 25, 1936.  F. T. IRGENS  2,031,891
INTERNAL COMBUSTION ENGINE
Filed April 9, 1934   3 Sheets-Sheet 1
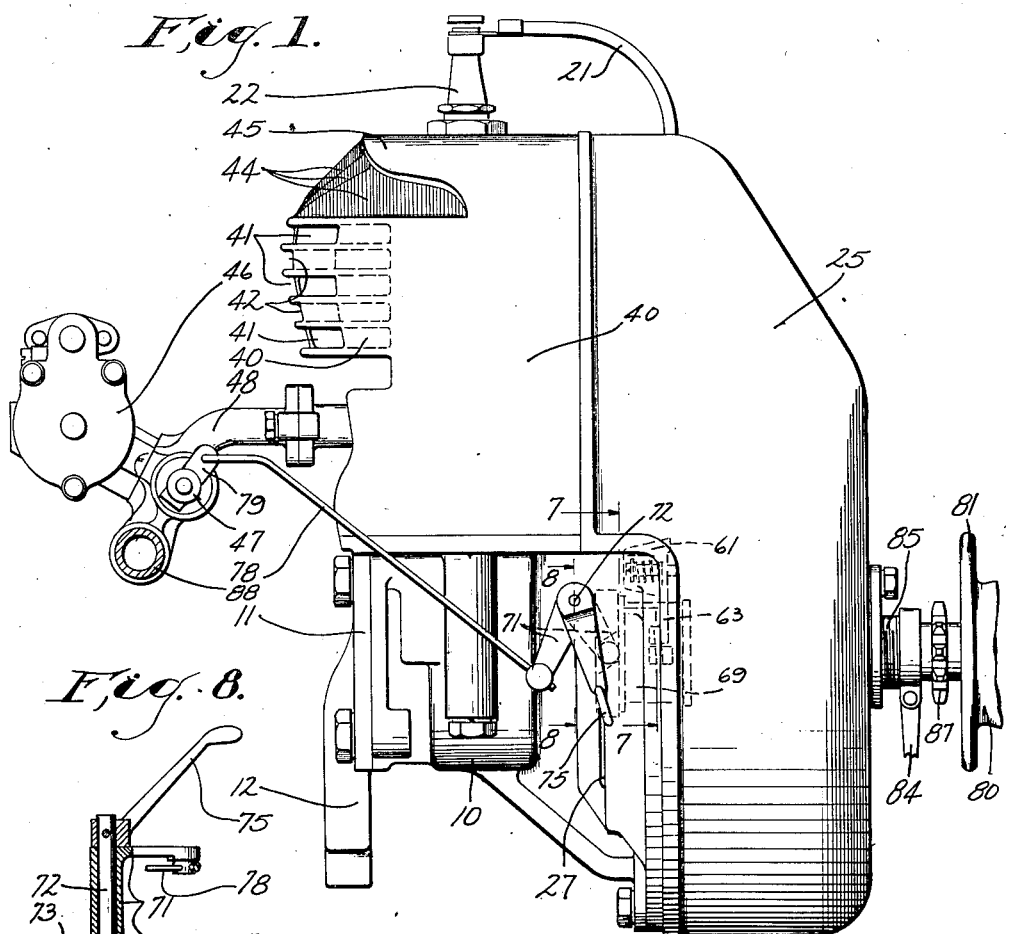
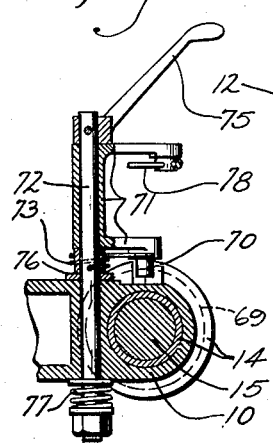
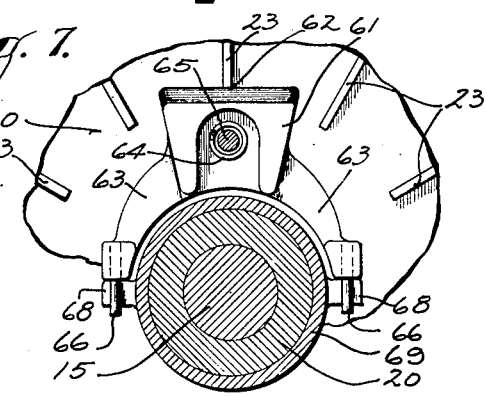
INVENTOR
Finn T. Irgens
BY
Wheeler, Wheeler & Wheeler
ATTORNEYS Feb. 25, 1936.  F. T. IRGENS  2,031,891
INTERNAL COMBUSTION ENGINE
Filed April 9, 1934  3 Sheets-Sheet 2
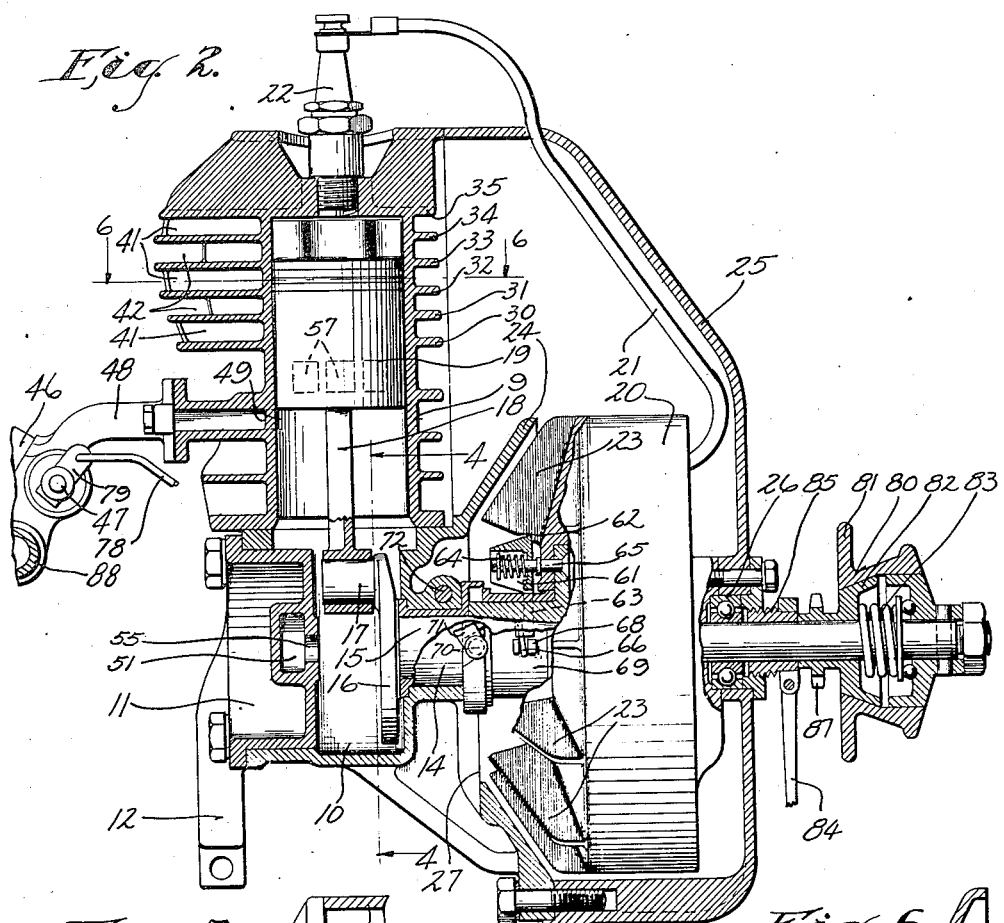
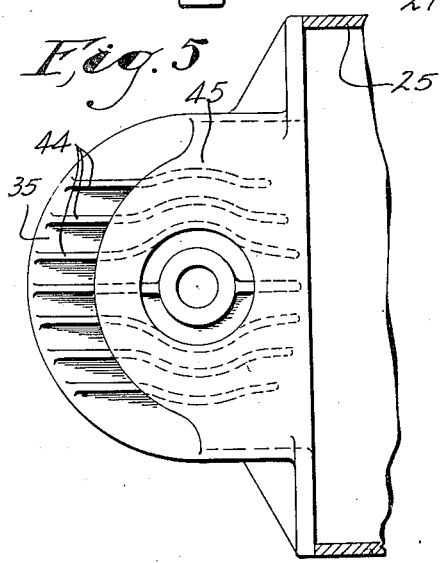
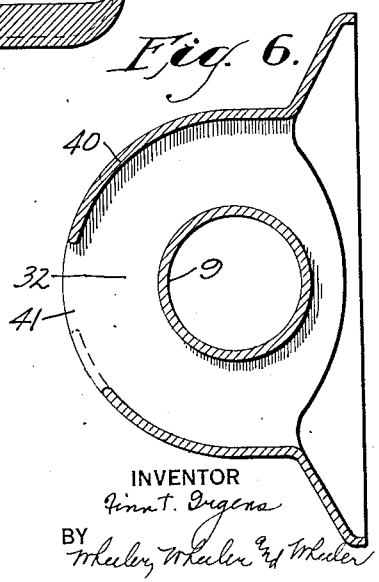
INVENTOR
Finn T. Irgens
BY Wheeler, Wheeler & Wheeler
ATTORNEYS Feb. 25, 1936.　　　F. T. IRGENS　　　2,031,891
INTERNAL COMBUSTION ENGINE
Filed April 9, 1934　　　3 Sheets-Sheet 3
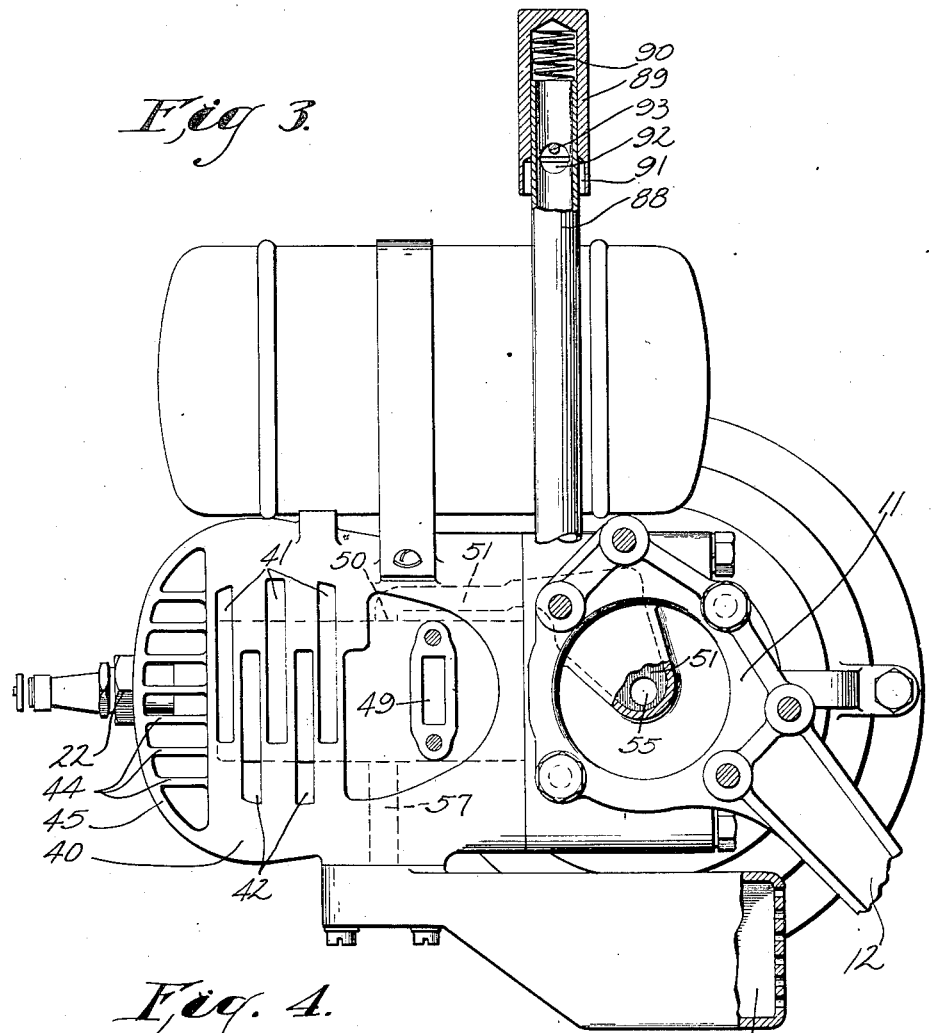
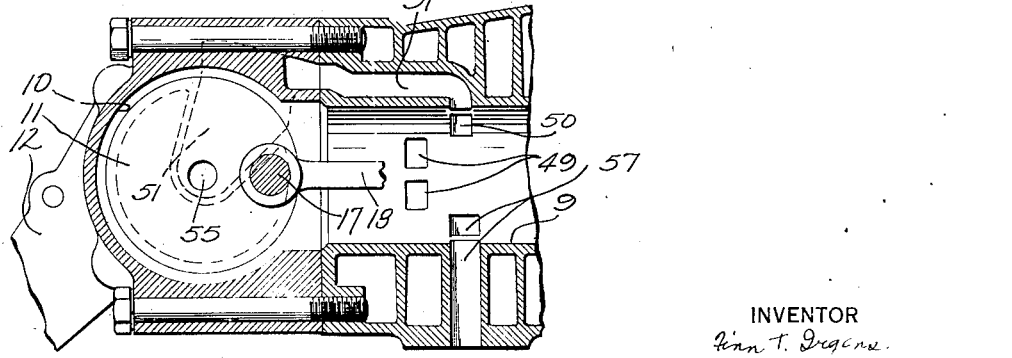
INVENTOR
Finn T. Irgens.
BY
ATTORNEYS Patented Feb. 25, 1936

2,031,891

UNITED STATES PATENT OFFICE 2,031,891

INTERNAL COMBUSTION ENGINE

Finn T. Irgens, Wauwatosa, Wis., assignor to Outboard Motors Corporation, Milwaukee, Wis., a corporation of Michigan Application April 9, 1934, Serial No. 719,686

5 Claims. (Cl. 123—73)

This invention relates to improvements in internal combustion engines. The type of engine herein disclosed to exemplify the invention is suitable for many applications involving the use of low power such as the propulsion of bicycles, lawn mowers, and other apparatus.

Among the objects of the invention are the provision of means for proper and efficient lubrication, and also a convenient and easily adjustable form of governor.

With reference to lubrication, it should be noted that ordinarily two cycle crank case compression engines are very wasteful of lubricant, which is introduced into the crank case with the fuel and tends to become transferred from the crank case to the combustion chamber and burned up. The present invention seeks to provide a structure in which automatic separation of a large proportion of the lubricant from the mixture will be effected at or near the crank case to minimize the losses of lubricant in the combustion chamber. With reference to the cooling of the engine herein disclosed, it is the object of the invention to provide a motor so designed as to ensure that the flow of cooling air will pass substantially equally on both sides of the cylinder so that neither side thereof will be excessively heated.

The governor herein disclosed is a novel form of centrifugal governor fitted into a combination fly wheel and fan.

In the drawings:

Figure 1 is a plan view of an engine embodying the present invention.

Figure 2 is a view of the engine in horizontal section, portions of the fly wheel being broken away.

Figure 3 is a front elevation of the motor with a portion of its crank case closure plate broken away.

Figure 4 is a fragmentary sectional view through the crank case and cylinder on the line 4—4 of Fig. 2.

Fig. 5 is a fragmentary end elevation of the cylinder head, a portion of the fly wheel cover being shown in section.

Figure 6 is a detail view taken in section on the line 6—6 of Figure 2.

Figure 7 is an enlarged detail of a governor weight showing the weight in elevation and the crank shaft and control collar in section.

Figure 8 is an enlarged detail in section of the governor control.

Like parts are identified by the same reference characters throughout the several views.

The engine includes a cylinder 9 and a crank case 10. A crank case closure 11 is, in this particular motor, a part of a supporting bracket 12. A crank case bushing 14 provides a bearing for the crank shaft 15 which is provided within the crank case with a disk 16 and crank pin 17 connected by means of a conventional connecting rod 18 with piston 19. The crank shaft also carries a conventional magneto fly wheel 20 from the coil of which (not shown) a lead 21 runs to the usual spark plug 22. Vanes 23 on the fly wheel serve to propel air for the cooling of the cylinder 9. These vanes rotate in a housing formed in part by a skirt 24 projecting from the crank case as shown in Fig. 2, and in part by a casing 25 which encloses the fly wheel and provides a bearing at 26 for the crank shaft. Air is admitted through a port at 27, and in order to escape from housing 25 must pass between the various cooling fins on the cylinder.

A novel feature of the engine consists in the manner in which the successive cooling fins 30, 31, 32, 33, 34 and 35 are not only cast integrally with the cylinder, but also are integral with a shroud or web 40 which connects their peripheral margins about the sides of the cylinder and partially across the front thereof, leaving staggered slots 41 and 42 which alternate as shown in Figs. 1, 2, 3, and 6, so that between successive pairs of fins the air will alternately flow more easily on different sides of the cylinder, thus ensuring the effective cooling of both sides.

About the spark plug 22 and beyond fin 35 is a series of axially projecting fins 44 which are likewise enclosed at the sides on top of the cylinder by a shroud portion 45 which is integral with the fins and with the shroud portion 40. The shroud comprising portions 40 and 45 is abutted by the housing member 25 through which the air passes to the fins.

The combustible mixture is supplied by a conventional carburetor 46 and, subject to a throttle 47, it enters the engine through manifold 48 and a port 49 opening into the cylinder at a point to be uncovered by piston 19 toward the end of its stroke. As the piston descends, the mixture is compressed therebeneath in the crank case until the top of the piston uncovers transfer port 50, which communicates with the engine crank case through a transfer passage 51 which is formed partially in the cylinder wall and partially in the crank case, and partially in the closure member 11, as shown in Figs. 2, 3 and 4. The actual communication between the crank case and the passage 51 is effected through an opening 55 which, for the purposes of the present invention, should either be at the axis of the crank shaft or close thereto.

It will be noted from Fig. 4 that the crank case is round in cross section in a plane at right angles to the axis of the crank shaft. The rotation of the crank disk 16 and the crank 17 and the lower end of connecting rod 18, has the effect of maintaining a cyclonic whirl or vortex in the crank case which tends to throw toward the outer periphery thereof all materials heavier than the air which comprises the major part of the combustible mixture.

The oil introduced into the crank case with the mixture (being usually mixed with the gasoline) does not atomize or vaporize as readily as the fuel, and hence tends to remain in larger globules than the gasoline. The fluid rotating in the crank case with the crank disk and crank is thus subject to a centrifugal separating action tending to maintain the relatively large and heavy drops of oil near the periphery while the lighter drops of fuel, together with the air, are at the center of the whirling mass. Thus, when the piston uncovers the transfer port 50 and at the same time compresses the mass within the crank case, the compressed mass will tend to escape through the axially located opening at 55 into the transfer passage 51 and thence to the combustion chamber, but the lighter particles will escape first and the major portion of the oil will never leave the crank case before transfer port 50 is again covered by the advancing piston.

As in most two cycle engines, the expansion stroke of the piston frees the oxidized gases by uncovering an exit port at 57 through which the gases escape into a muffler 60.

To control the speed of the device, a governor is built into the combined fly wheel magneto and fan. The governor weight 61 is fulcrumed at 62 in a notch in one of the vanes 23 of the fly wheel in such a way that its arms 63 tend to move axially of the crank shaft toward the crank case as the speed of the fly wheel increases. Such movement is opposed in part by a compression spring 64 carried by a post 65 and bearing upon the weight 61.

When the weight oscillates in opposition to spring 64, pins 66 carried in the ends of arms 63 and engaged with lugs 68 on collar 69, move the collar in an axial direction against a pin 70 and a bell crank 71. The bell crank is mounted loosely on a rock shaft 72 above which is a torsion spring 73 fixed at one end and bearing at its other end against pin 70 to supplement the spring 64 in closing the tilting movement of weight 61. The torsion of spring 73 is adjusted by means of a lever 75 whereby the shaft 72 may be rotated upon its axis to turn the sleeve 76 to which torsion spring 73 is fixed, and thereby to increase or decrease the torsion of said spring. A spring 77 carried by shaft 72 bears against the crank case 10 to subject the shaft to sufficient axial thrust so that friction will maintain it in any position to which lever 75 is adjusted.

According as the torsion of spring 73 is adjusted, the governor weight 61 will be caused to move centrifugally at greater or less crank shaft speeds of rotation. When it does move to oscillate the bell crank 71, the motion of the bell crank will be transmitted through link 78 to lever 79 on the throttle valve 47 in a direction to throttle the engine increasingly as the governor weight is centrifugally tilted about its fulcrum at 62, the throttle being opened progressively as the torsion of the two springs 73 and 64 become adequate, at reduced engine speeds, to restore the governor weight to the position in which it appears in Fig. 2.

The power of the engine crank shaft 15 may be delivered through a clutch member 80 which has a flange 81 to adapt it for service also as a starting rope pulley. The driven clutch member 82 is held in engagement with the driving clutch member by means of compression spring 83 subject to displacement when lever 84 rotates threaded plug 85 sufficiently with reference to housing 25 to force the driven clutch member 82 axially against the compression of spring 83. When the clutch is engaged the motion of the driven clutch member is transmitted through a sprocket 87 to the device to be driven by the engine.

For convenience of starting, the carburetor inlet pipe 88 may be provided with a cap 89 yieldably supported by spring 90 from the end of the pipe to the limit permitted by pin 93 which is engaged in the air inlet hole 92 of the pipe. A counterbore 91 on the cap normally admits air through hole 92 to pipe 88 and thence to the carburetor, but when the operator presses downwardly on the cap 89, the cap is caused to telescope over the pipe 88 and thereby to bring the counterbore 91 out of registry with hole 92 to choke the air supply. The operator may conveniently rest a portion of his weight upon the cap 89 for choking purposes while he manipulates a conventional starting rope on the pulley constituted by clutch member 80 and flange 81.

I claim:

1. A two cycle internal combustion engine comprising the combination with a cylinder having a transfer passage in its side opening into the cylinder, of a crank case connected to the cylinder and provided with crank shaft bearing means, a crank shaft journaled in said means, and a detachable closure for one end of said crank case provided centrally with an opening and including means providing a passage communicating with the passage of said cylinder.

2. A two-cycle internal combustion engine comprising the combination with a cylinder having admission ports and a transfer passage, of a crank case connected to the cylinder and provided with a single crank shaft bearing, and a crank shaft journaled in said bearing and having an exposed crank, said crank case having an aperture substantially aligned with the axis of the crank shaft communicating with said transfer passage and about which said crank rotates.

3. A two-cycle internal combustion engine comprising the combination with a cylinder having an admission port and a transfer passage leading thereto, of a crank case connected with the cylinder and having a crank shaft bearing at one side and an opening substantially aligned with the bearing at the other, a chamber on the outside of the crank case into which said opening communicates, said chamber being materially larger than the opening and being connected with said passage.

4. A two-cycle internal combustion engine comprising the combination with a cylinder having an admission port and a transfer passage, of crank case means comprising a head provided with a crank shaft bearing, and a second head having an opening substantially aligned with said bearing and a passage exteriorly of said opening leading therefrom to said first mentioned passage; a single throw crank shaft in said bearing having a crank revoluble about said opening; a piston reciprocable in the cylinder; and a connecting rod operatively connecting the piston with the crank.

5. A two-cycle internal combustion engine comprising the combination with a piston and a cylinder therefor having a transfer passage leading thereto, of a crank case, a crank shaft and means providing an opening leading substantially axially of said crank shaft from said crank case, and a chamber materially larger than said opening outside of said crank case and comprising a means of communication of said opening with said passage.

FINN T. IRGENS.